United States Patent [19]

Nally

[11] 4,100,599
[45] Jul. 11, 1978

[54] METHOD AND APPARATUS FOR DETERMINING VELOCITY OF A MOVING MEMBER

[75] Inventor: Robert B. Nally, Waterloo, Canada

[73] Assignee: NCR Canada Ltd. - NCR Canada LTEE, Mississauga, Canada

[21] Appl. No.: 753,044

[22] Filed: Dec. 22, 1976

[51] Int. Cl.² .................. G01P 3/36; G06F 15/20
[52] U.S. Cl. .................................. 364/565; 356/28
[58] Field of Search .............. 235/151.32; 356/28, 356/27; 324/160, 175; 364/565

[56] References Cited

U.S. PATENT DOCUMENTS

| | | | |
|---|---|---|---|
| 3,714,393 | 1/1973 | Johnson et al. | 235/151.32 X |
| 3,725,655 | 4/1973 | Edstrom et al. | 235/151.32 |
| 3,824,015 | 7/1974 | Petit et al. | 356/28 |
| 3,885,873 | 5/1975 | Andermo | 356/28 |

Primary Examiner—Edward J. Wise
Attorney, Agent, or Firm—J. T. Cavender; Wilbert Hawk, Jr.; Richard W. Lavin

[57] ABSTRACT

A method and apparatus is disclosed for determining the velocity of a document over a fixed distance of travel. Sensing means are provided for generating signals which are used in determining the value of the time the document requires to move over the fixed distance. Using terms of a Taylor series expansion of the velocity equation, a value of the velocity is determined utilizing digital elements requiring only multiplication and addition operations. The elements include a digital multiplier and accumulator together with a plurality of storage devices which utilize the value of the time together with a plurality of predetermined constants to determine and output the value of the velocity to a display which displays the velocity in numerical form.

16 Claims, 5 Drawing Figures

METHOD AND APPARATUS FOR DETERMINING VELOCITY OF A MOVING MEMBER

BACKGROUND OF THE INVENTION

This invention relates to a method and apparatus for measuring and displaying in numerical form the speed of a moving member. In high speed document sorters or similar devices wherein documents are transported at high speeds past a reading member such as a magnetic transducer and where data is read from each document for use in sorting the document, it is desirable to know the speed of the document to insure that the document will move past the reading member at a speed which will allow the reading member to provide a valid read operation. Normally the velocity of the document must fall within a predetermined range of velocity values in order that the reading member will produce a valid read operation. One method of measuring the speed of a document over a given distance is to set up two photosensors at a fixed distance ($d$) apart adjacent the path of movement of the document. When the object is sensed by the first sensor a digital oscillator is started and when the object reaches the second sensor the oscillator is stopped. The number of pulses ($n$) produced by the oscillator during this time is counted. The time taken for the object to travel the fixed distance between the two sensors is given by the equation:

$$t = n \times (1/f)$$

where $f$ = frequency of the oscillator. Since the fixed distance ($d$) between the two sensors is known, the speed ($v$) of the document is given by the equation $$v = (d/n) \times f.$$

To obtain a high accuracy of measurement in measuring the time ($t$), the oscillator frequency must be made very large and therefore the number of pulses measured must be very large. In utilizing digital processing equipment to determine this speed, a large memory would be required to store the number of pulses in addition to requiring a large capacity for performing the division of $df/n$ digitally, the operation being relatively slow due to the number of divisional operations required. It is therefore an object of this invention to provide a method and apparatus for measuring the speed of a document utilizing digital apparatus. It is another object of this invention to provide a method and apparatus for measuring the speed of a document wherein digital multiplication rather than digital division circuitry is utilized. It is a further object of this invention to provide a method and apparatus for measuring the speed of a document which requires minimum system hardware to implement the method resulting in lower cost of operation.

SUMMARY OF THE INVENTION

In order to carry out these objects there is provided a pair of sensing members which together with an oscillator and counter determine the time a document travels over a fixed distance between the sensing members. Utilizing a Taylor series expansion of the velocity equation distance/time about a preselected mean velocity of the document, the velocity of the document can be determined using only a multiplier, an accumulator and a plurality of storage devices. After a series of multiplication and addition operations have been performed, the accumulator outputs the value of the velocity to a numerical display unit which displays the velocity in numerical form. The multiplier and accumulator are operated in accordance with the equation:

$$V(t) = K_5 + t[K_6 + t(K_7 + K_4 t)]$$

where the constants $K_4$ to $K_7$, inclusive, are determined and stored in the storage devices prior to the sensing of the document as it moves between the sensing members, the constants being a function of the fixed distance between the photosensors and the speed range allowable by which the reading member will provide a valid read operation.

DESCRIPTION OF THE PREFERRED EMBODIMENT

Figure 1:
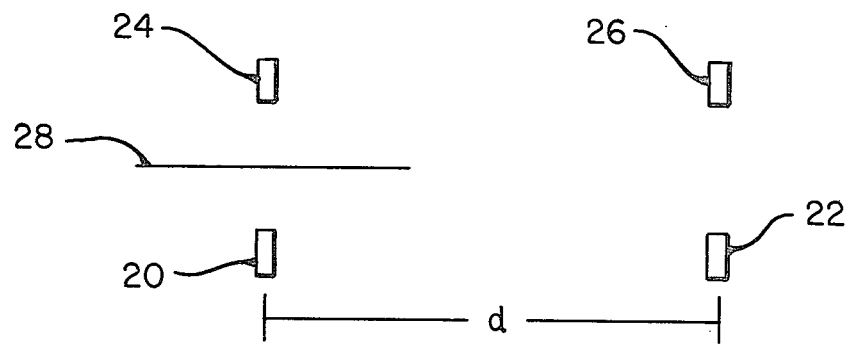
FIG. 1 is a schematic representation of the location of document sensing devices adjacent the path of movement of a document.

Referring now to FIG. 1 of the drawing, there is illustrated the location of a pair of photo-detectors 20, 22 together with associated light sources 24, 26, respectively, adjacent the path of movement of a document 28, such as a check, which detectors and light sources may be found on document sorter devices of the type that are well known in the art. As shown in FIG. 1, the photo-detectors 20, 22 are separated by a predetermined fixed distance $d$. The leading edge of the document 28 will intercept the photo-detectors 20 and 22 resulting in the generation of a pair of control signals which, as will be described more fully hereinafter, will control the generation of a number of clock pulses $n$ generated by an oscillator and representing the time the document required to travel over the distance $d$. Since the velocity V of the document is determined by the equation:

$$V = d/t \text{ and } t = n \times (1/f)$$

where $f$ = frequency of the oscillator, the velocity can be determined by the equation:

$$V = (d/n) \times f.$$

Figure 2:
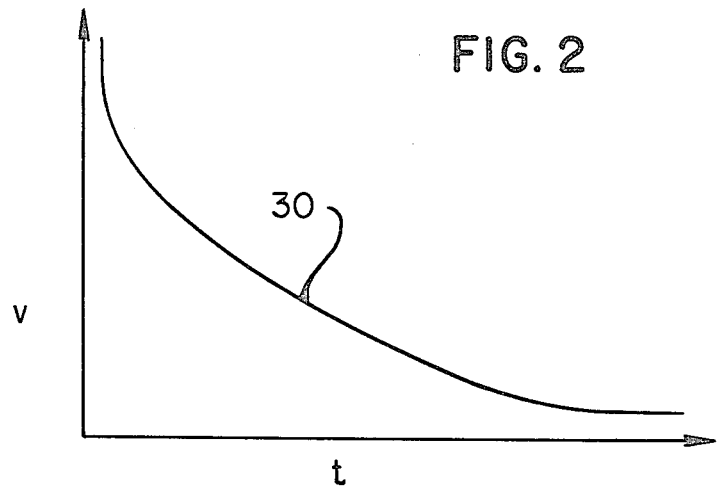
FIG. 2 is a graphical relationship between velocity and time of movement of the document over a fixed distance.

As illustrated in FIG. 2, the velocity of the document is represented by the curve 30 which is a function of distance and time. To approximate the curve 30 using a Taylor series expansion, the following general equation of $f(x)$ about a given point a along the curve 30 apply:

$$f(x) = f(a) + (x - a)f'(a) + \quad \text{[Equation 1]}$$

-continued
$$\frac{(x-a)^2}{2!} f^2(a) + \frac{(x-a)^3}{3!} f^3(a) + \frac{(x-a)^4}{4!} f^4(a) + \ldots$$

where the designation "!" represents the factorial function of the numerical designation. Applying the above equation to FIGS. 1 and 2

V = speed of object in inches/sec
d = distance between photo-detectors
n = number of pulses counted
$V_m$ = mid-range of speeds to be measured (inches/sec)
f = oscillator frequency in $H_z$ or cps
$t_m$ = mid-range of time to be measured (seconds)
$n_m$ = count n at $V_m$
and using the standard equation $$V = (d \times f)/n \text{ and } t = n/f$$

resulting in $V = d/t$
and substituting $f(x) = V(t)$
  $x = t$
  $a = t_m = (n_m/f)$
Equation (1) becomes:

$$V(t) = V(t_m) + (t - t_m) V^1(t_m) + \quad \text{[Equation 2]}$$

$$(\frac{t-t_m}{2!})^2 \times V^2(t_m) + \frac{(t-t_m)^3}{3!} V^3(t_m) + \frac{(t-t_m)^4}{4!} V^4(t_m) + \ldots$$

Equation 2 represents the first four terms of the Taylor series expansion. If more accuracy is required in the determination of the value of the velocity, more terms may be added
letting $K_1 = V(t_m) = d/t_m$ $$K_2 = \frac{V^1}{1!}(t_m) = \frac{-d}{t_m^2}$$

$$K_3 = \frac{V^2}{2!}(t_m) = \frac{2d}{t_m^3} \times \frac{1}{2!} = \frac{d}{t_m^3}$$

$$K_4 = \frac{V^3}{3!}(t_m) = \frac{-6d}{t_m^4} \times \frac{1}{3!} = \frac{-d}{t_m^4}$$

where V is the function V(t) and $V^1$, $V^2$, $V^3$ are the successive derivatives of the function V(t where t is evaluated at $t_m$. These terms were developed using the general equation $$V^n(t_n) = \frac{d^n V(t)}{dt^n} \quad \text{[Equation 3]}$$

where
  $t = t_m$
  $n = n^{th}$ derivative.

Equation 3 represents the derivative of the function V(t), n times and then evaluating the result for $t = t_m$ where $t_m$ is a preselected mean value taken between the value of time which define the allowable range of velocity of the document to insure a valid read operation by the magnetic read head associated with the sorting apparatus. Thus, it is obvious that the constants $K_1 - K_4$, inclusive, can be determined prior to the operation of the sorting apparatus.

Substituting the constants $K_1$–$K_4$, inclusive, as defined above, Equation 2 becomes $$V(t) = K_1 + (t-t_m)K_2 + (t-t_m)^2 K_3 + (t-t_m)^3 K_4 =$$
$$K_1 + K_2 t - K_2 t_m + K_3 t^2 - K_3(2t)(t_m) + K_3 t_m^2 +$$
$$K_4 t^3 - K_4 (3t^2)(t_m) + K_4(3t_m^2)(t) - K_4(t_m)^3 =$$
$$(K_1 - t_m K_2 + K_3 t^2 m - K_4 t^3 m) + (K_2 - 2K_3 t_m +$$
$$3K_4 t_m^2)t + (K_3 - 3K_4 t_m)t^2 + k_4 t^3 \quad \text{[Equation 4]}$$

letting
  $K_5 = (K_1 - K_2 t_m + K_3 t_m^3 - K_4 t_m^3)$
  $K_6 = (K_2 - 2 K_3 t_m + 3K_4 t_m^2)$
  $K_7 = (K_3 - 3 K_4 t_m)$
Equation (4) becomes $$V(t) = K_5 + K_6 t + K_7 t^2 + K_4 t^3 = K_5 + t[K_6 + t(K_7 + K_4 t)] \quad \text{[Equation 5]}$$

From Equation (5) it can be seen that the velocity of the document can be determined by knowing t where t = n/f and the constants $K_4$–$K_7$, inclusive, each of which are based on the fixed distance d and a preselected value of time taken between the allowable limits of time which define the range of allowable velocity as described previously.

Figure 3:
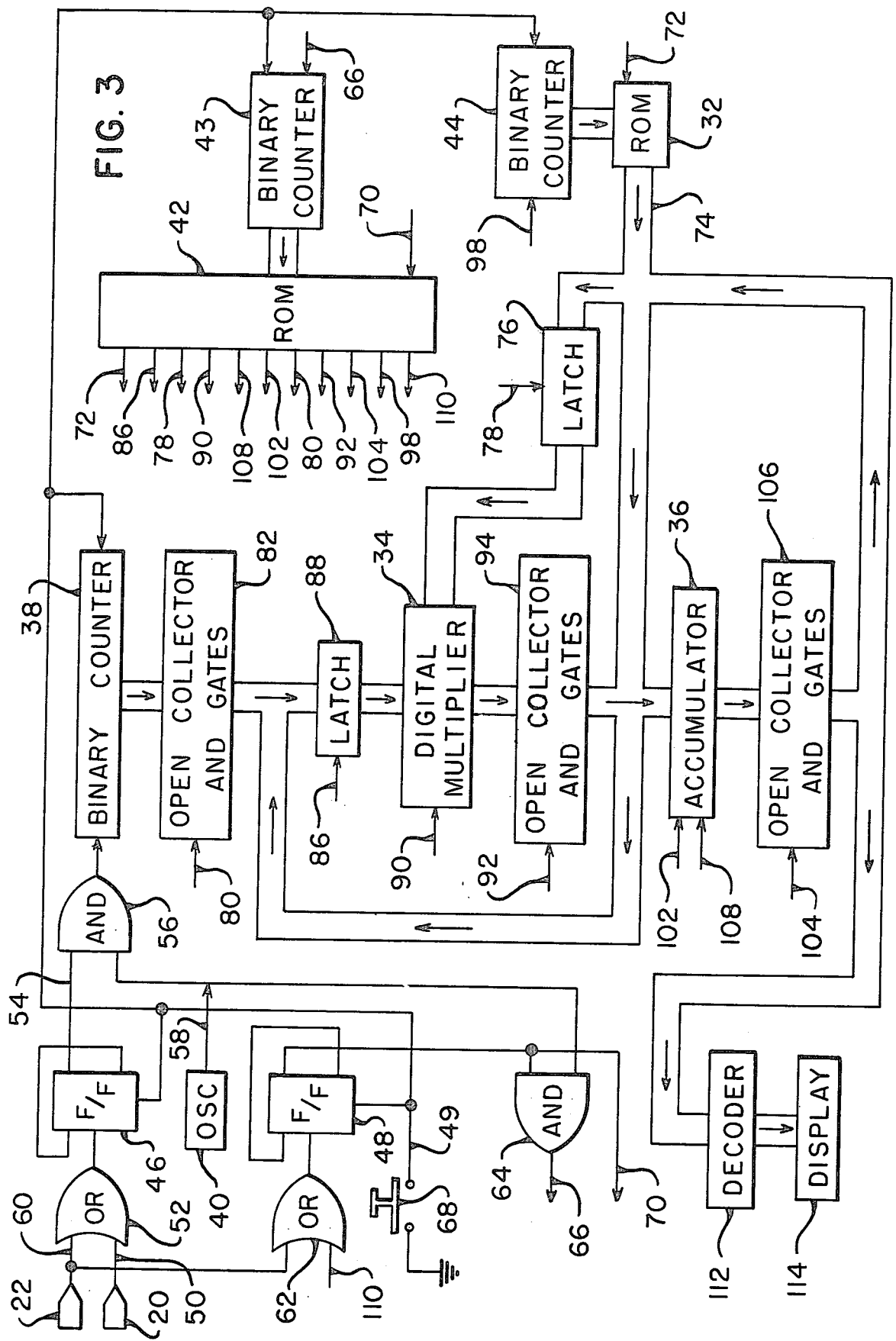
FIG. 3 is a block diagram of the system utilized in determining the speed of the document in accordance with a preferred embodiment of the invention.

Referring now to FIG. 3, there is shown the configuration of a system of digital devices which may be utilized in determining the speed of the document in accordance with a preferred embodiment of the invention. For purposes of the present description, the system includes a type 93406 read only memory (ROM) 32 manufactured by Texas Instruments Incorporated, in which memory are stored in binary form the constants $K_4$, $K_5$, $K_6$ and $K_7$ and the constant 1/frequency. In addition to the ROM memory 32, other Texas Instrument elements of the system, except where noted, include a type 9344 digital multiplier 34, an accumulator 36 which may be a combination of a type 7483 binary full adder and type 74175 Quad D-type latches, a type 9316 binary counter 38 manufactured by Fairchild Semiconductor for counting the number of clock pulses that occur between the time the document 28 (FIG. 1) moves between the sensors 20 and 22 (FIG. 1), a free running oscillator 40 for generating the clock pulses used in determining the time of travel of the document between the two sensors 20 and 22, and a second type 93406 ROM 42 for storing the timing and control signals necessary to operate the system to measure the speed of the document. Associated with the ROM's 42 and 32 are type 9316 program counters 43 and 44 which output binary addresses to access the timing signals stored in ROM 42 and the digital constants $K_4$–$K_7$, inclusive, and 1/f stored in ROM 32.

With reference to the timing diagram of FIG. 5 and the flow diagram of FIG. 4, the operation of the system disclosed in FIG. 3 will now be described. With the constants $K_4$, $K_5$, $K_6$, and $K_7$ and 1/f determined in the manner described previously and stored in the ROM 32 (block 118 of FIG. 4), a system reset pulse 5(A) of FIG. 5 will be generated over line 49 (FIG. 3) by the closing of switch 68 for resetting the binary counter 38 (FIG. 3), the program counters 42, 44 and type 7474 D type flip-flops 46 and 48. Upon the leading edge of the document 28 intercepting the light beam from the light source 24 (FIG. 1), the photo-detector 20 will generate a pulse 5(C) of FIG. 5 over its output 50 (FIG. 3) through a type 7432 OR gate 52 to the set input of the flip-flop 46. An output pulse 5(D) of FIG. 5 of the flip-flop 46 when in the set condition will be transmitted over its output 54 to a type 7408 AND gate 56, thereby enabling the AND gate 56. The AND gate 56, when enabled, gates a number of pulses 5(E) derived from clock pulses 5(B) which are generated by the free running oscillator 40, the output 58 of which oscillator 40 is connected to AND gate 56, to a second type 7408 AND gate 64 and to the counter 38 which starts its count of the clock pulses 5(B) from the oscillator 40.

Figure 5:
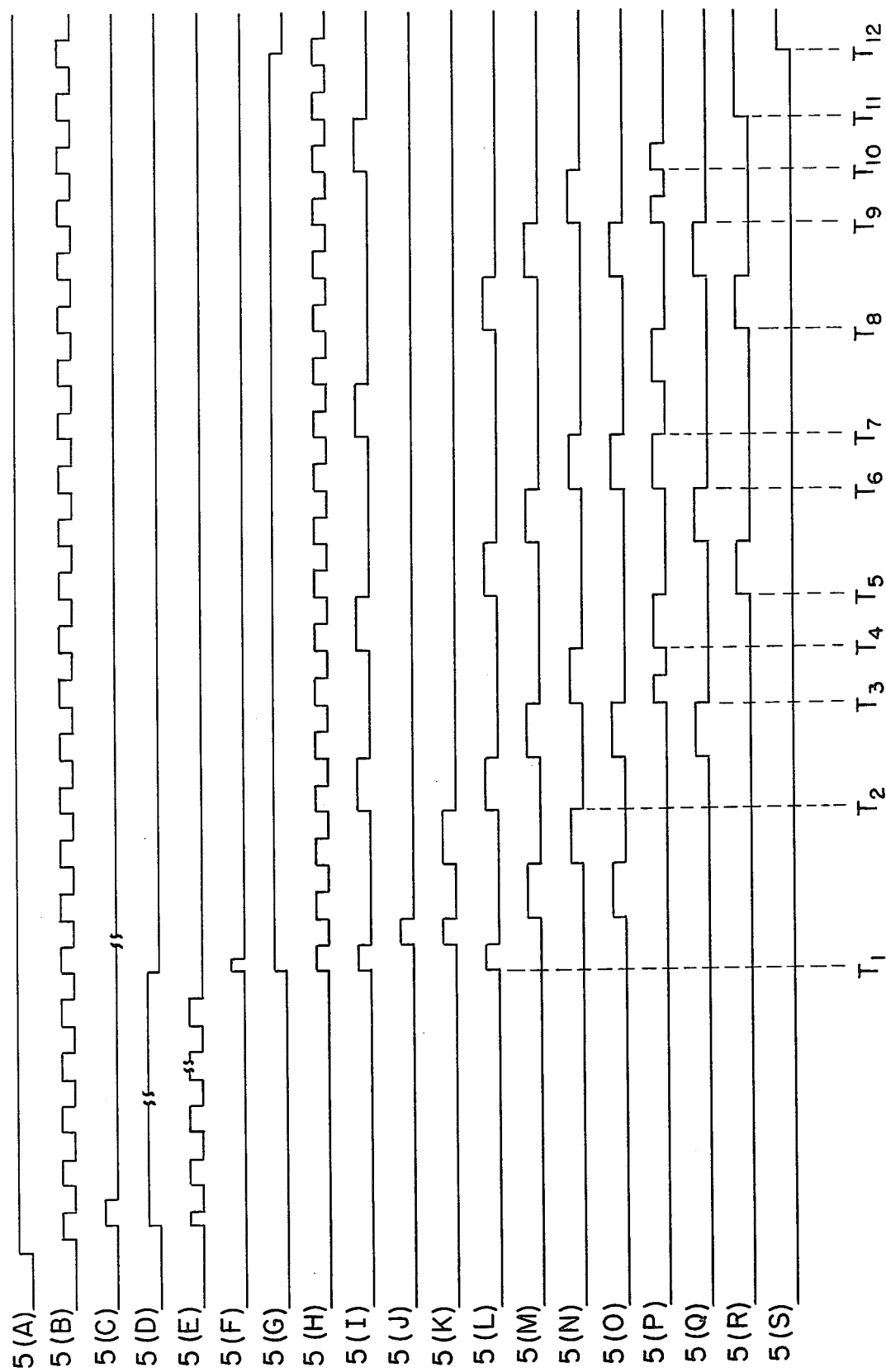
FIG. 5 is a diagram illustrating the various timing and control signals (A)-(S) employed in operation of the present invention.

Upon the leading edge of the document 28 intercepting the light beam from the light source 26, the photo-detector 22 (FIG. 1) will generate a pulse 5(F) of FIG. 5 over its output 60 through OR gate 52 to flip-flop 46 for resetting the flip-flop 46. This action results in the output pulse 5(D) of the flip-flop 46 going low, thus disabling the AND gate 56 and the binary counter 38 from receiving any further clock pulses. At this time, the binary counter 38 will have a count equal to the number of pulses generated by the oscillator 40, which represents the time required for the document 28 to cover the fixed distance d (FIG. 1) between the photo-detectors 20 and 22. The generation of pulse 5(F) of FIG. 5 occurs at time $T_1$ as shown in FIG. 3.

The pulse 5(F) from the photo-detector 22 is also transmitted through OR gate 62 to the set input of flip-flop 48 which enables AND gate 64 to gate a system clock pulse 5(H) from the oscillator 40 to the binary counter 43 over line 66, causing the counter 43 to start counting thereby producing the binary addresses required to output from the ROM 42 the necessary timing and control signals of FIG. 5 required for the operation of the digital devices shown in FIG. 3. The setting of flip-flop 48 also generates a pulse 5(G) of FIG. 5 over line 70 which enables ROM 42 for operation.

The enabling of ROM 42 at this time generates the pulse 5(I) of FIG. 5 over line 72 enabling ROM 32 (FIG. 3). As described previously, ROM 32 contains all the pre-calculated constants required for the determination of the speed of the document. For example, a digital constant representing $1/f$, where $f$ is equal to the frequency of the oscillator 40, is stored at address (000) in ROM 32. Similarly, the constants $K_4$, $K_7$, $K_6$, and $K_5$ are stored at addresses (001, 010, 011 and 100), respectively. The ROM 32 requires a three bit address word (if five constants are stored) from the program counter 44 for access to the required constants at the appropriate time. When reset, the output of the counter 44 is at address (000).

The enabling of ROM 32 at this time produces the constant $1/f$ which is loaded (block 120 of FIg. 4) over data bus 74 into a type 9308 latch 76 manufactured by Fairchild Semiconductor by the pulse 5(L) of FIG. 5 being transmitted over line 78 from ROM 42 to latch 76. Pulse 5(J) generated over line 80 of ROM 42 enables a number of type 7409 open collector AND gates 82 for loading the pulse (n) from counter 38 onto the data bus 74. Pulse 5(K) of FIG. 5 generated over line 86 of ROM 42 loads (block 122 of FIG. 4) this pulse count (n) into a type 9308 latch 88 (FIG. 3). The values in latch 76 and latch 88 are now multiplied (block 124 of FIG. 4) by the digital multiplier 34 under the control of pulse 5(M) generated over line 90 of ROM 42. The results of this operation is equal to $t$, the time taken for the document 28 to travel from photo-detector 20 to photo-detector 22.

Figure 4:
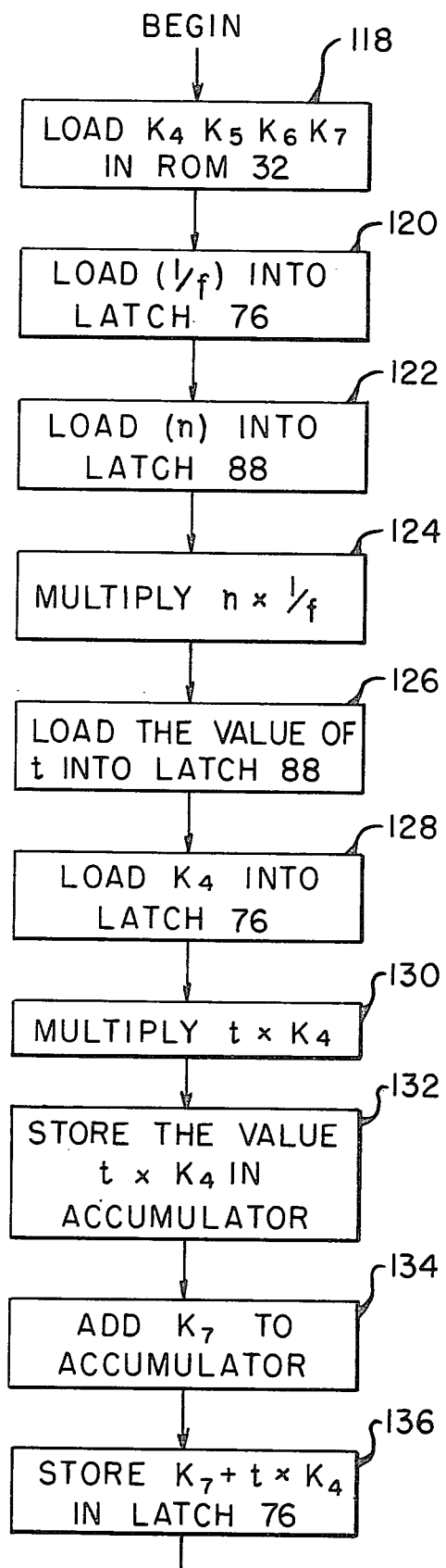
FIG. 4 is a flow diagram showing the method of the present invention performed by the system of the present invention.
Figure 4:
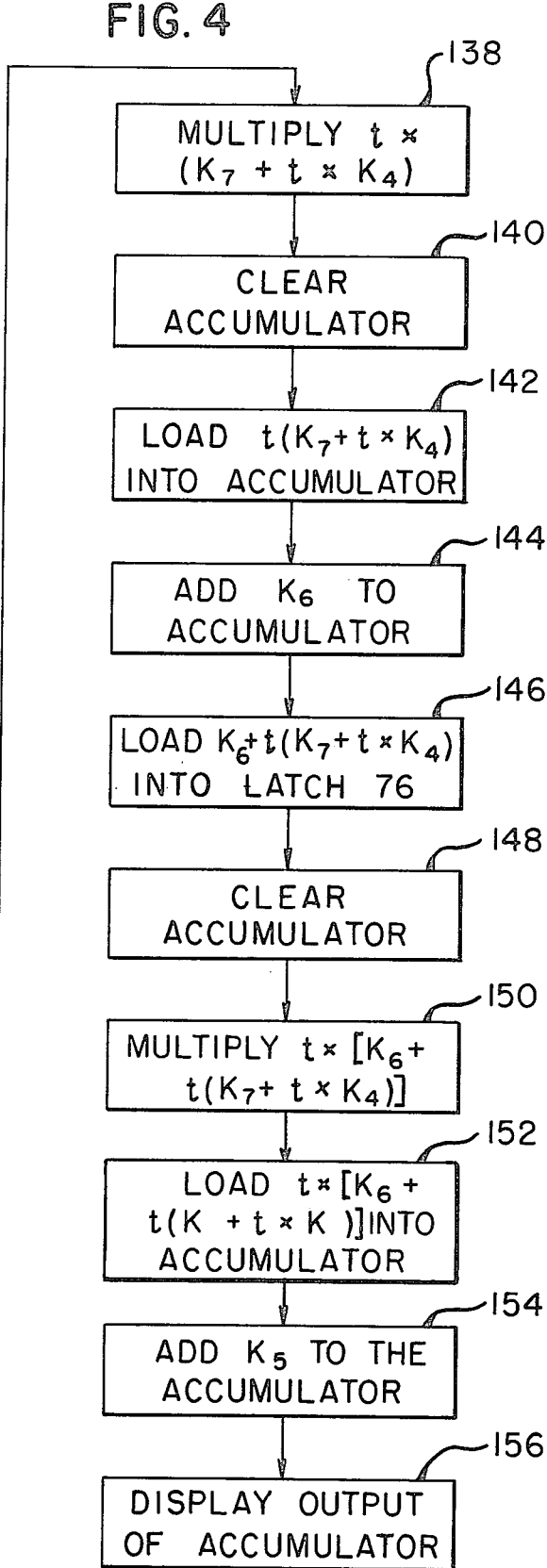

At the end of the operation of the multiplier 34, the pulse 5(N) of FIG. 5 is generated over line 92 of ROM 42 and enables a number of type 7409 open collector AND gates 94 to load the value of $t$ into the data bus 74 which, upon the generation of a second pulse 5(K) over line 86 of ROM 42, will transfer the value of $t$ into the latch 88 (block 126 of FIG. 4). When pulse 5(K) returns to 0, the timing sequence will be at time $T_2$ (FIG. 5).

At such time $T_2$ (FIG. 5), the pulse 5(O) will have been generated over line 98 of ROM 42 (FIG. 3) incrementing the program counter 44 to output the address (001) to ROM 32. As described previously, the constant $K_4$ is stored at address (001) in ROM 32. Upon the generation of the pulse 5(I) at time $T_2$ over line 72, the constant $K_4$ will be outputted from ROM 32 onto the data bus 74. Generation of the pulse 5(L) over line 78 from ROM 42 will then load the constant $K_4$ into the latch 76 (block 128 of FIG. 4). Pulse 5(M) is then generated over line 90 from ROM 42 to enable the digital multiplier 34 to multiply the value of $t$ stored in latch 88 by the $K_4$ constant stored in latch 76 (block 130 of FIG. 4). The pulse 5(I) will have returned to logic 0, thereby disabling ROM 32 and the program counter 44 is then incremented by a further pulse 5(O) of FIG. 5 being generated over line 98 from ROM 42 to output the next address from the counter 44 which is (010). This address will output the constant $K_7$ upon the enabling of ROM 32. The timing sequence of FIG. 5 will now be at time $T_3$.

A further pulse 5(N) is generated at this time $T_3$ over line 92 from ROM 42, which outputs the value $(t \times K_4)$ from the multiplier 34 onto the data bus 74 through AND gates 94 where it is loaded into the accumulator 36 (block 132 of FIG. 4) by the generation of a pulse 5(P) over line 102 from ROM 42. The timing sequence of FIG. 5 is now at time $T_4$. The enabling pulse 5(N) returns to a logic zero, thereby disabling the AND gates 94. While this is occurring, a pulse 5(I) is generated at time $T_4$ (FIG. 5) over line 72 from ROM 42 enabling ROM 32 which outputs the constant $K_7$ onto the data bus 74. The only enabling pulse generated at this time is pulse 5(P) which enables the accumulator 36 resulting in the constant $K_7$ being added (block 134 of FIG. 4) to the value $(t \times K_4)$ which was previously stored in the accumulator. The result $(K_7 + t \times K_4)$ remains stored in the accumulator 36. The timing sequence of FIG. 5 is now at time $T_5$.

At 45 (FIG. 5), the pulse 5(R) is generated over output line 104 from ROM 42 (FIG. 3) which enables the open collector AND gates 106 to output the value $(K_7 + t \times K_4)$ from the accumulator 36 onto the data bus 74. At time $T_5$ pulse 5(L) is generated over line 78 to load the value $(K_7 + t \times K_4)$ into latch 76 (block 136 of FIG. 4). Pulse 5(M) is then generated over line 90 to enable the multiplier 34, which multiplies the value $t$ stored in latch 88 by the value $(K_7 + t \times K_4)$ stored in latch 76, to produce the value $t (K_7 + t \times 4)$ — (block 138 of FIG. 4). At the same time the pulse 5(Q) of FIG. 5 is generated over line 108 from ROM 42 to clear the accumulator 36 (block 140 of FIG. 4).

At time $T_6$ (FIG. 5), pulse 5(P) is generated over line 102 of ROM 42 to load the value $t (K_7 + t \times K_4)$ into the accumulator 36 (block 142 of FIG. 4), while pulse 5(O) is generated over line 98 to increment the program counter 44 to output the address (011) thereby conditioning the ROM 32 to output the constant $K_6$ from ROM 32 during the next timing operation.

At time $T_7$ (FIG. 5), pulse 5(I) is generated over line 72 from ROM 42 to ROM 32, which outputs the value $K_6$ onto the data bus 74. When pulse 5(L) returns to logic zero, pulse 5(P) is t over line 102 tothe accumulator 36 to add $K_6$ to the value $t(K_7 + t \times K_4)$ which was stored in the accumulator 36 thus producing the value $K_6 + t(K_7 + t \times K_4)$ — (block 144 of FIG. 4).

At time $T_7$ (FIG. 5), pulse 5(R) is generated over line 104 from ROM 42 enabling the AND gates 106 while pulse 5(L) is generated over line 78 enabling latch 76 to receive the value $K_6 + t(K_7 + t \times K_4)$ over the data bus 74 (block 146 of FIG. 4) from the accumulator 36. Pulse 5(Q) is now generated over line 108 from ROM 42 to clear the accumulator 36 (block 148 of FIG. 4) while pulse 5(O) is generated over line 98 to increment the program counter 44 to output the address (100) to ROM 32 which will output the value $K_5$ when enabled. Simultaneously, pulse 5(M) is generated over line 90 from ROM 42 thereby enabling the multiplier 34 which results in the value $t[K_6 + t(K_7 + t \times K_4)]$ being generated at the output of the multiplier 34 (block 150 of FIG. 4). t t ×

At time $T_9$ of FIG. 5, the pulse 5(N) is generated over line 92 from ROM 42 to enable the AND gates 94 thus storing the value $t[K_6 + t(K_7 + t \times K_4)]$ in the accumulator 36 (block 152 of FIG. 4) on the generation of the pulse 5(P). Pulse 5(I) is now generated at time $T_{10}$ (FIG. 5) over line 72 from ROM 42 enabling ROM 32 which outputs the value $K_5$ onto the data bus 74. Upon generation of pulse 5(P) over line 102 from ROM 42, the value $K_5$ is added into the accumulator 36 (Block 154 of FIG. 4) producing the value of $K_5 + k(K_6 + t(K_7 + t \times K_4)$. This value now stored in the accumulator 36 represents the velocity of the document 28 (FIG. 1) as it travels over the fixed distance $d$ (FIG. 1) between the photo-detectors 20 and 22.

At time $T_{11}$ (FIG. 5), the pulse 5(R) is generated over line 104 from ROM 42, thereby enabling the AND gates 106 to output the value $K_5 + t[K_6 + t(K_7 + t \times K_4)]$ from the accumulator 36. The pulse 5(S) of FIG. 5 is now generated at time $T_{12}$ (FIG. 5) over line 110 from ROM 42 which is transmitted through OR gate 62 for resetting the flip-flop 48 and thereby disabling AND gate 64, counter 43 and ROM 42, thus stopping the generation of the timing and control signals from ROM 42. The disabling of ROM 42 at time $T_{12}$ (FIG. 5) retains the pulse 5(R) at a logic one in line 104, thereby enabling the AND gates 106 for loading the digital value of the velocity, stored in the accumulator 36, onto the data bus 74 where it is transmitted to a standard binary to 7-segment decoder 112 (FIG. 3) which decodes the information for display on a 7-segment display unit 114 (block 156 of FIG. 4). The value displayed may be in feet per second or some other system of units. In any event this value indicates the velocity of the document which, as described previously, must fall within a prdetermined range for assuring a valid read operation.

While there has been described a form of the invention and its mode of operation, it will be apparent to those skilled in the art that changes may be made in the apparatus described without departing from the spirit and scope of the invention as set forth in the appended claims and that in some cases certain features of the invention may be used to advantage or modified without corresponding changes in other features while certain features may be substituted for or eliminated as appreciated by those skilled in the art. Thus, the method of determination the velocity of the moving member can be used with a microprocessor or other type of processing units performing in the manner described herein.

What is claimed is:

1. A method of maximizing a computer for determining the velocity of a moving member over a predetermined distance comprising the steps of
    (a) storing the value of the time required for the member to travel through said predetermined distance and the values of a plurality of constants representing the velocity and the successive derivatives of the velocity at the mean value of the time of travel through said predetermined distance in a plurality of storage units;
    (b) multiplying the value of time and a first constant stored in said plurality of storage units to derive a first product;
    (c) storing the value of the first product in another of said storage units;
    (d) adding a second constant stored in said plurality of storage units to the first product stored in said another of said storage units to derive a first sum in said another of said storage units;
    (e) multiplying the value of time and the first sum to produce a second product;
    (f) storing the second product in said another of said storage units;
    (g) and repeating steps (d), (e) and (f) until the last of the constants stored in said plurality of storage units has been added to the product stored in said another of said storage units to produce a sum which is the value of the velocity of the moving member.

2. The method of claim 1 which further includes the step of displaying the value of the sum upon the addition of the last constant.

3. A method of maximizing a digital processor in determining the velocity of a moving document comprising the steps of
    (a) storing the value of the time required for a document to move through a predetermined distance in a first storage unit;
    (b) storing a plurality of constants representing the velocity and successive derivatives of the velocity of the mean value of a preselected time of movement of the document in a second storage unit;
    (c) multiplying the value of time in said first storage unit with a first constant stored in said second storage unit;
    (d) storing the value of the product derived in step (c) in a third storage unit;
    (e) adding a second constant stored in said second storage unit to the product stored in said third storage unit to produce a first sum in said third storage unit;
    (f) multiplying the value of time stored in said first storage unit with the sum stored in said third storage unit to produce a second product;
    (g) storing the second product in said third storage unit;
    (h) and repeating steps (e), (f) and (g) until the last constant stored in said second storage unit is added to the product stored in said third storage unit.

4. The method of claim 3 further comprising the steps of displaying the value of the sum stored in said third storage unit upon the addition of the last constant to the product stored in said third storage unit.

5. A method of maximizing a digital processor in determining the velocity of a moving member comprising the steps of (a) storing the digital value of the time required for the member to travel over a predetermined distance in a latch member;

(b) storing a plurality of digital constants representing the velocity and the successive derivatives of the velocity of the mean value of a predetermined time range in a storage unit;

(c) multiply the digital value of the time in the latch member with one of the constants stored in said storage unit;

(d) storing the result of step (c) in an accumulator;

(e) adding another of said constants to the accumulator (f) storing the digital sum of step (e) in a second latch member;

(g) multiplying the digital sum in a second latch member with the value stored in said first latch member;

(h) clearing the accumulator;

(i) repeating the steps (d) through (t) until the last constant is added to the accumulator;

(k) and displaying the digital sum found in the accumulator after step (i) has occurred.

6. The method of claim 5 further comprising the steps of (a) decoding the digital value stored in said accumulator after the last constant has been added to the accumulator to generate a plurality of electrical signals;

(b) and operating a display in response to the generation of said electrical signals.

7. A system for generating a value of the velocity of a moving member comprising:

(a) means for generating a signal representing the time ($t$) of movement of the member through a predetermined distance ($d$);

(b) means for storing the value of time;

(c) means for storing values representing the velocity and the successive derivatives of the velocity at a preselected mean value of the time ($t_m$) of movement through said distance;

(d) and means for adding and multiplying the value of time and the values representing the velocity and the successive derivatives of the velocity to derive a value of the velocity of the moving member in accordance with the terms of a Taylor series expansion of the equation $d/t$ developed using the following equation:

$$V^n(t_n) = [d^n V(t)/dt^n]$$

wherein $t = t_m$
$n = n^{th}$ derivtive.

8. The system of claim 3 which further includes means responsive to the generation of the value of the velocity of the moving member to display the value of the velocity.

9. The system of claim 7 in which said generating means includes (a) means for generating a predetermined number of clock signals in response to the movement of the member through a predetermined distance;

(b) and means responsive to the generation of said clock signals for generating a signal representing the time of movement through said distance.

10. The system of claim 7 wherein said means for computing the value of the velocity operates according to the formula $$V - K_5 + t[K_6 + t(K_7 + k_4 t)]$$

where $t = $ value of time of movement
$K_4$-$K_7$ inch $= $ constants representing the velocity and the successive derivatives of the velocity at a mean value of time of movement.

11. A system for determining the velocity of a moving document comprising:

(a) sensing means positioned adjacent the path of movement of the document for generating a first and second output signal upon sensing the document, said sensing means separated by a predetermind distance ($d$);

(b) means for generating a plurality of clock pulses at a predetermined frequency;

(c) means responsive to said first and second output signals for counting a number of clock pulses in accordance with the generation of said first and second output signals;

(d) first storage means for storing said number of clock pulses;

(e) second storage means for storing the reciprocal of said predetermined frequency and a plurality of values representing the velocity and the successive derivatives of the velocity at a pre-selected means value of the time of movement of the document through said predetermined distance;

(f) multiplying means;

(g) adding means;

(h) and control means for operating said multiplying means to generate a product of the number of clock pulses and the reciprocal of the frequency, said control means further operating said multiplying means and said adding means for alternately multiplying the product and adding the plurality of values representing the velocity and the successive derivative of the velocity to derive the value of the velocity of the moving document in accordance with the terms of a Taylor series expansion of the equation $d/t$ developed using the following equation:

$$V^n(t_n) = [d^n V(t)/dt^n]$$

where
$t = t_m$
$n = n^{th}$ derivative.

12. The system of claim 11 includes means responsive to the generation of the value of the velocity to display said value.

13. The system of claim 11 wherein said control means operates the multiplying and adding means in accordance with the formula $$V = K_5 + t[K_6 + t(K_7 + K_4 t)]$$

wherein $t = $ value of time of movement of the document
$K_4$-$K_7$ inclusive $= $ constants representing the velocity and the successive derivatives of the velocity at a mean value of time of movement.

14. Apparatus for determining the velocity of a moving member comprising:

(a) first storage means for storing the time of movement of the member through a predetermined distance;

(b) second storage means for storing the velocity and successive derivatives of the velocity of the member at a preselected value of time;

(c) third storage means;

(d) first control means for sequentially transferring the contents of said second storage means to said third storage means;

(e) means for multiplying the contents of said first and third storage means deriving the product of the time and the contents of said third storage means;

(f) means for adding the product derived from said multiplying means to one of said successive derivatives;

(g) and second control means for alternately operating said multiplying means and said adding means until all of the derivatives stored in said second storage means has been added to the last product derived from the operation of said multiplying means.

15. The apparatus of claim 14 which further includes display means controlled to said adding means to display the sum of the last derivative stored in said second storage means and the last product.

16. Apparatus for determining the velocity of a moving document along a predetermined path comprising:

(a) a pair of sensing means positioned adjacent said path for generating a first and second output signal upon sensing the document as it moves along said path, said sensing means separated by a predetermined width;

(b) means for generating a plurality of clock pulses at a predetermined frequency;

(c) means connected to said generating means and responsive to said first and second output signal for counting a number of clock pulses in accordance with the generating of said first and second output signals;

(d) first storage means for storing said number of clock pulses;

(e) addressable storage means for storing data representing the reciprocal of the frequency of said clock pulses, and the velocity and successive derivatives of the velocity of the document at a preselected value of time;

(f) third storage means for storing the addresses of data stored in said addressable storage means, said third storage means connected to said addressable storage means;

(g) fourth storage means connected to said addressable storage means;

(h) multiplying means for multiplying the contents of said first storage means with the contents of said fourth storage means to derive a product;

(i) adding means connected to said multiplying means and said addressable and fourth storage means to add the data representing the velocity and the successive derivatives of the velocity to the product;

(j) first control means for operating said third storage means to effect transfer of the reciprocal of the frequency to said fourth storage means and to operate said multiplying mans to derive a value of time;

(k) second control means for storing the value of time in said first storage means;

(l) third control means for operating said third storage means to effect transfer of the data in said addressable storage means to said adding means;

(m) and fourth control means for alternately operating said multiplying means and said adding means wherein the sum in said adding means is multiplied by the value of time stored in said first storage means and the data in said addressable storage means is added to the product of said multiplying means.

* * * * *